US009858439B1

(12) United States Patent
Beaumont et al.

(10) Patent No.: US 9,858,439 B1
(45) Date of Patent: Jan. 2, 2018

(54) DATA PROCESSING SYSTEMS FOR IDENTIFYING WHETHER COOKIES CONTAIN PERSONALLY IDENTIFYING INFORMATION

(71) Applicant: OneTrust, LLC, Atlanta, GA (US)

(72) Inventors: Richard Beaumont, London (GB); John Mannix, London (GB)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 15/626,052

(22) Filed: Jun. 16, 2017

(51) Int. Cl.
G06F 21/62 (2013.01)
H04L 29/06 (2006.01)

(52) U.S. Cl.
CPC ...... *G06F 21/6263* (2013.01); *H04L 63/1433* (2013.01)

(58) Field of Classification Search
None
See application file for complete search history.

(56) References Cited

U.S. PATENT DOCUMENTS

| 6,816,944 | B2 | 11/2004 | Peng |
| 6,925,443 | B1 | 8/2005 | Baggett, Jr. et al. |
| 7,234,065 | B2 | 6/2007 | Breslin et al. |
| 7,251,624 | B1 | 7/2007 | Lee et al. |
| 7,260,830 | B2 | 8/2007 | Sugimoto |
| 7,287,280 | B2 | 10/2007 | Young |
| 7,478,157 | B2 | 1/2009 | Bohrer et al. |
| 7,603,356 | B2 * | 10/2009 | Schran ............... G06F 21/6263 |
| 7,729,940 | B2 | 6/2010 | Harvey et al. |
| 7,788,632 | B2 | 8/2010 | Kuester et al. |
| 7,801,758 | B2 | 9/2010 | Gracie et al. |
| 7,853,468 | B2 | 12/2010 | Callahan et al. |
| 7,877,812 | B2 | 1/2011 | Koved et al. |
| 7,885,841 | B2 | 2/2011 | King |
| 7,966,663 | B2 | 6/2011 | Strickland et al. |
| 7,991,559 | B2 | 8/2011 | Dzekunov et al. |
| 8,146,074 | B2 | 3/2012 | Ito et al. |

(Continued)

FOREIGN PATENT DOCUMENTS

WO 2015116905 8/2015

OTHER PUBLICATIONS

International Search Report, dated Jun. 21, 2017, from corresponding International Application No. PCT/US2017/025600.

(Continued)

*Primary Examiner* — Malcolm Cribbs
(74) *Attorney, Agent, or Firm* — Brient Globerman, LLC

(57) ABSTRACT

A system for identifying and determining whether a particular cookie may include personal data, in various embodiments, is configured to analyze collected cookies to determine whether the collected cookies may be used to directly or indirectly identify a particular individual. The system may, for example: (1) generate one or more virtual profiles; (2) use the one or more virtual profiles to access a plurality of websites; (3) collect cookie data for the plurality of websites for the one or more virtual profiles; and (4) analyze the cookie data to determine whether a particular website of the plurality of websites utilizes one or more cookies which may potentially include personal data. The system may then generate a report of the analysis, and display the report to an administrator or other individual associated with the particular website.

20 Claims, 5 Drawing Sheets

(56) References Cited

U.S. PATENT DOCUMENTS

| | | | |
|---|---|---|---|
| 8,156,158 B2 | 4/2012 | Rolls et al. | |
| 8,504,481 B2 | 8/2013 | Motahari et al. | |
| 8,578,036 B1* | 11/2013 | Holfelder | G06F 17/30864 709/204 |
| 8,583,694 B2 | 11/2013 | Siegel et al. | |
| 8,712,813 B2 | 4/2014 | King | |
| 8,805,707 B2 | 8/2014 | Schumann, Jr. et al. | |
| 8,805,925 B2 | 8/2014 | Price et al. | |
| 8,812,342 B2 | 8/2014 | Barcelo et al. | |
| 8,826,446 B1 | 9/2014 | Liu et al. | |
| 8,914,299 B2 | 12/2014 | Pesci-Anderson et al. | |
| 8,943,076 B2 | 1/2015 | Stewart et al. | |
| 9,092,796 B2 | 7/2015 | Eversoll et al. | |
| 9,094,434 B2 | 7/2015 | Williams et al. | |
| 9,152,820 B1* | 10/2015 | Pauley, Jr. | G06F 21/6263 |
| 9,158,655 B2 | 10/2015 | Wadhwani et al. | |
| 9,202,085 B2 | 12/2015 | Mawdsley et al. | |
| 9,215,252 B2 | 12/2015 | Smith et al. | |
| 9,288,118 B1* | 3/2016 | Pattan | H04L 67/306 |
| 9,338,188 B1 | 5/2016 | Ahn | |
| 9,384,357 B2 | 7/2016 | Patil et al. | |
| 9,401,900 B2 | 7/2016 | Levasseur et al. | |
| 9,424,021 B2 | 8/2016 | Zamir | |
| 9,477,660 B2 | 10/2016 | Scott et al. | |
| 9,507,960 B2 | 11/2016 | Bell et al. | |
| 9,602,529 B2 | 3/2017 | Jones et al. | |
| 9,646,095 B1* | 5/2017 | Gottlieb | G06F 17/30867 |
| 9,652,314 B2 | 5/2017 | Mahiddini | |
| 9,654,541 B1* | 5/2017 | Kapczynski | H04L 67/02 |
| 9,691,090 B1 | 6/2017 | Barday | |
| 9,721,108 B2* | 8/2017 | Krishnamurthy | G06F 21/60 |
| 2003/0041250 A1 | 2/2003 | Proudler | |
| 2003/0093539 A1* | 5/2003 | Simeloff | G06F 21/31 709/229 |
| 2006/0075122 A1* | 4/2006 | Lindskog | G06F 21/6263 709/228 |
| 2007/0027715 A1 | 2/2007 | Gropper et al. | |
| 2007/0157311 A1 | 7/2007 | Meier et al. | |
| 2007/0266420 A1 | 11/2007 | Hawkins et al. | |
| 2007/0283171 A1 | 12/2007 | Breslin et al. | |
| 2008/0028435 A1* | 1/2008 | Strickland | G06Q 10/083 726/1 |
| 2008/0052775 A1* | 2/2008 | Sandhu | G06F 21/6263 726/14 |
| 2009/0204452 A1 | 8/2009 | Iskandar et al. | |
| 2009/0217301 A1* | 8/2009 | Grant | G06F 21/31 719/320 |
| 2010/0121773 A1 | 5/2010 | Currier et al. | |
| 2010/0199356 A1* | 8/2010 | Krishnamurthy | G06F 21/6254 726/26 |
| 2010/0333012 A1 | 12/2010 | Adachi et al. | |
| 2011/0010202 A1 | 1/2011 | Neale | |
| 2011/0126290 A1* | 5/2011 | Krishnamurthy | G06F 21/6263 726/26 |
| 2012/0102543 A1 | 4/2012 | Kohli et al. | |
| 2012/0116923 A1* | 5/2012 | Irving | G06Q 30/0641 705/27.1 |
| 2012/0259752 A1 | 10/2012 | Agee | |
| 2013/0024441 A1* | 1/2013 | Sun | G06F 17/30864 707/710 |
| 2013/0036434 A1* | 2/2013 | Shkedi | H04N 21/4524 725/14 |
| 2013/0212638 A1* | 8/2013 | Wilson | H04L 63/20 726/1 |
| 2013/0311224 A1 | 11/2013 | Heroux et al. | |
| 2013/0332362 A1 | 12/2013 | Ciurea | |
| 2013/0340086 A1* | 12/2013 | Blom | G06F 21/6245 726/26 |
| 2014/0006616 A1 | 1/2014 | Aad et al. | |
| 2014/0012833 A1 | 1/2014 | Humprecht | |
| 2014/0032265 A1* | 1/2014 | Paprocki | G06Q 30/0201 705/7.29 |
| 2014/0040134 A1 | 2/2014 | Ciurea | |
| 2014/0047551 A1 | 2/2014 | Nagasundaram et al. | |
| 2014/0089039 A1 | 3/2014 | McClellan | |
| 2014/0208418 A1 | 7/2014 | Libin | |
| 2014/0278663 A1 | 9/2014 | Samuel et al. | |
| 2014/0283027 A1 | 9/2014 | Orona et al. | |
| 2014/0337466 A1* | 11/2014 | Li | H04L 63/0407 709/217 |
| 2015/0066577 A1 | 3/2015 | Christiansen et al. | |
| 2015/0106948 A1 | 4/2015 | Holman et al. | |
| 2015/0106949 A1 | 4/2015 | Holman et al. | |
| 2015/0169318 A1 | 6/2015 | Nash | |
| 2015/0229664 A1 | 8/2015 | Hawthorn et al. | |
| 2015/0242778 A1 | 8/2015 | Wilcox et al. | |
| 2015/0269384 A1 | 9/2015 | Holman et al. | |
| 2015/0356362 A1 | 12/2015 | Demos | |
| 2016/0048700 A1 | 2/2016 | Stransky-Heilkron | |
| 2016/0099963 A1 | 4/2016 | Mahaffey et al. | |
| 2016/0162269 A1 | 6/2016 | Pogorelik et al. | |
| 2016/0234319 A1 | 8/2016 | Griffin | |
| 2016/0321748 A1 | 11/2016 | Mahatma et al. | |
| 2016/0364736 A1* | 12/2016 | Maugans, III | G06Q 30/0201 |
| 2017/0142158 A1* | 5/2017 | Laoutaris | H04L 63/20 |
| 2017/0161520 A1* | 6/2017 | Lockhart, III | H04L 63/08 |
| 2017/0177324 A1 | 6/2017 | Frank et al. | |
| 2017/0193624 A1* | 7/2017 | Tsai | G06Q 50/01 |
| 2017/0206707 A1 | 7/2017 | Guay et al. | |

OTHER PUBLICATIONS

Written Opinion of the International Searching Authority, dated Jun. 21, 2017, from corresponding International Application No. PCT/US2017/025600.

Office Action, dated Dec. 15, 2016, from corresponding U.S. Appl. No. 15/256,419.

Restriction Requirement, dated Jan. 18, 2017, from corresponding U.S. Appl. No. 15/256,430.

Restriction Requirement, dated Nov. 21, 2016, from corresponding U.S. Appl. No. 15/254,901.

TRUSTe Announces General Availability of Assessment Manager for Enterprises to Streamline Data Privacy Management with Automation, PRNewswire, Mar. 4, 2015.

www.truste.com (1), 200150207, Internet Archive Wayback Machine, www.archive.org,2_7_2015.

Notice of Allowance, dated Apr. 12, 2017, from corresponding U.S. Appl. No. 15/256,419.

Notice of Allowance, dated May 5, 2017, from corresponding U.S. Appl. No. 15/254,901.

International Search Report, dated Jun. 6, 2017, from corresponding International Application No. PCT/US2017/025605.

International Search Report, dated Jun. 6, 2017, from corresponding International Application No. PCT/US2017/025611.

Written Opinion of the International Searching Authority, dated Jun. 6, 2017, from corresponding International Application No. PCT/US2017/025611.

Written Opinion of the International Searching Authority, dated Jun. 6, 2017, from corresponding International Application No. PCT/US2017/025605.

Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

International Search Report, dated Aug. 15, 2017, from corresponding International Application No. PCT/US2017/036919.

International Search Report, dated Aug. 8, 2017, from corresponding International Application No. PCT/US2017/036889.

International Search Report, dated Aug. 8, 2017, from corresponding International Application No. PCT/US2017/036890.

International Search Report, dated Aug. 8, 2017, from corresponding International Application No. PCT/US2017/036893.

International Search Report, dated Aug. 8, 2017, from corresponding International Application No. PCT/US2017/036901.

International Search Report, dated Aug. 8, 2017, from corresponding International Application No. PCT/US2017/036913.

International Search Report, dated Aug. 8, 2017, from corresponding International Application No. PCT/US2017/036920.

(56) References Cited

OTHER PUBLICATIONS

Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Office Action, dated Jul. 21, 2017, from corresponding U.S. Appl. No. 15/256,430.
Restriction Requirement, dated Jul. 28, 2017, from corresponding U.S. Appl. No. 15/169,658.
Symantec, Symantex Data Loss Prevention—Discover, monitor, and protect confidential data; 2008; Symantec Corporation; http://www.mssuk.com/images/Symantec%2014552315_IRC_BR_DLP_03_09_sngl.pdf.
Written Opinion of the International Searching Authority, dated Aug. 15, 2017, from corresponding International Application No. PCT/US2017/036919.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Notice of Allowance, dated Aug. 18, 2017, from corresponding U.S. Appl. No. 15/619,455.
Office Action, dated Aug. 24, 2017, from corresponding U.S. Appl. No. 15/619,451.
International Search Report, dated Aug. 21, 2017, from corresponding International Application No. PCT/US2017/036914.
Invitation to Pay Additional Search Fees, dated Aug. 24, 2017, from corresponding International Application No. PCT/US2017/036888.
Office Action, dated Aug. 24, 2017, from corresponding U.S. Appl. No. 15/169,643.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Written Opinion of the International Searching Authority, dated Aug. 21, 2017, from corresponding International Application No. PCT/US2017/036914.
Office Action, dated Sep. 1, 2017, from corresponding U.S. Appl. No. 15/619,459.
International Search Report, dated Aug. 29, 2017, from corresponding International Application No. PCT/US2017/036898.
International Search Report, dated Sep. 1, 2017, from corresponding International Application No. PCT/US2017/036896.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 19, 2017, from corresponding U.S. Appl. No. 15/671,073.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Written Opinion of the International Searching Authority, dated Aug. 29, 2017, from corresponding International Application No. PCT/US2017/036898.
Written Opinion of the International Searching Authority, dated Sep. 1, 2017, from corresponding International Application No. PCT/US2017/036896.
Office Action, dated Sep. 22, 2017, from corresponding U.S. Appl. No. 15/619,278.
International Search Report, dated Oct. 3, 2017, from corresponding International Application No. PCT/US2017/036912.
Written Opinion of the International Searching Authority, dated Oct. 3, 2017, from corresponding International Application No. PCT/US2017/036912.
International Search Report, dated Oct. 12, 2017, from corresponding International Application No. PCT/US2017/036888.
Written Opinion of the International Searching Authority, dated Oct. 12, 2017, from corresponding International Application No. PCT/US2017/036888.
International Search Report, dated Oct. 20, 2017, from corresponding International Application No. PCT/US2017/036917.
Written Opinion of the International Searching Authority, dated Oct. 20, 2017, from corresponding International Application No. PCT/US2017/036917.
Office Action, dated Nov. 1, 2017, from corresponding U.S. Appl. No. 15/169,658.
Notice of Allowance, dated Nov. 7, 2017, from corresponding U.S. Appl. No. 15/671,073.

* cited by examiner

400

Site contents

The contents of this site are sample. All hotels, cars and motorcycles listed here do not really exist and the prices shown are sample and only for demo purposes.

Demo site limitations

For security reasons some features on the demo site are disabled. For example you dont have access to the whole Elxis administration but only in component Reservations. You can not install

This website uses cookies

This website uses cookies to improve user experience. By using our website you consent to all cookies in accordance with our Cookie Policy

[ I understand ]   [ Read more ]

FIG. 4

DATA PROCESSING SYSTEMS FOR IDENTIFYING WHETHER COOKIES CONTAIN PERSONALLY IDENTIFYING INFORMATION

BACKGROUND

Changes in legal and industry regulations related to the creation, collection, and storage of cookies for web site visitors have affected what sort of information can be included in cookies. Depending on a type and purpose of a particular cookie, the particular cookie may be required to avoid utilizing personally identifiable information. Accordingly, there is a need for improved systems and methods to ensure that website cookies follow relevant industry and legal requirements.

SUMMARY

A computer-implemented data processing method for identifying personal data in a particular cookie, in particular embodiments, comprises: (1) scanning, by one or more processors, using a plurality of unique user profiles, a single website for one or more cookies; (2) scanning, by one or more processors, a plurality of websites using a first particular one of the plurality of unique user profiles that persists across the plurality of websites for the one or more cookies; (3) identifying, by one or more processors, the particular cookie from the one or more cookies; (4) determining, by one or more processors, a host of the particular cookie; (5) determining, by one or more processors, a purpose of the particular cookie; (6) determining, by one or more processors, based at least in part on the host of the particular cookie and the purpose of the particular cookie, whether a particular individual is likely to be identified by the particular cookie; and (7) in response to determining that a particular individual is likely to be identified by the particular cookie, generating, by one or more processors, a report regarding a likelihood that the particular individual might be identified by the particular cookie; and (7) displaying, by one or more processors, the report to an individual associated with the single website.

In any embodiment described herein, the method may include determining whether a particular cookie is a first-party or a third-party cookie. In other embodiments, the method may comprise determining whether the particular cookie is a session cookie or a persistent cookie. In various embodiments, the method may involve determining a complexity of a particular cookie, and, in response to determining that the particular cookie has at least a certain level of complexity, the method may include determining that the particular cookie may be used to identify the particular individual.

A computer-implemented data-processing method of determining whether a particular cookie of one or more cookies may include personally-identifiable data, in any of the embodiments described herein, comprises: (1) creating, by one or more processors, a plurality of unique user profiles; (2) storing, by one or more processors, the plurality of unique user profiles in computer memory; (3) using, by one or more processors, each of the plurality of unique user profiles to access a plurality of websites over a first period of time; (4) gathering, by one or more processors, for each of the plurality of websites, cookie data for each of the plurality of unique user profiles, the cookie data comprising the one or more cookies; (5) determining, by one or more processors, for each of the one or more cookies, a respective cookie host; (6) determining, by one or more processors, for each of the one or more cookies, a respective cookie purpose; (7) determining, by one or more processors, based on the respective cookie purpose and the respective cookie host, whether a particular cookie of the one or more cookies may include personally identifiable data; (8) in response to determining that the particular cookie of the one or more cookies may include the personally identifiable data, transmitting a notification to an individual associated with at least one of the plurality of websites comprising the cookie data associated with the particular cookie.

A computer-implemented data-processing method of identifying one or more cookies of a plurality of cookies that may contain personal data, in particular embodiments, comprises: (1) creating, by one or more processors, a first unique user profile; (2) storing, by one or more processors, the first unique user profile in memory; (3) using, by one or more processors, the first unique user profile to access one or more first webpages of a first website; (4) collecting, by one or more processors, for each of the one or more first webpages, first cookie data for the first unique user profile, the first cookie data being associated with a first plurality of cookies; (5) using, by one or more processors, the first unique user profile to access one or more second webpages of a second web site; (6) collecting, by one or more processors, for each of the one or more second webpages, second cookie data for the first unique user profile, the second cookie data being associated with a second plurality of cookies; (7) determining, by one or more processors, based on the first cookie data and the second cookie data, whether the first plurality of cookies contain one or more cookies that may contain personal data; (8) in response to determining that the first plurality of cookies contain one or more cookies that may contain personal data, generating, by one or more processors, a report including the first plurality of cookies; and (8) displaying, by one or more processors, the report to a site-owner of the first web site.

BRIEF DESCRIPTION OF THE DRAWINGS

Various embodiments of a system and method for determining whether particular cookies include personal data or may potentially be used to identify a particular individual are described below. In the course of this description, reference will be made to the accompanying drawings, which are not necessarily drawn to scale, and wherein:

FIGS. 4-5 depict exemplary screen displays and graphical user interfaces (GUIs) according to various embodiments of the system, which may display information associated with the system or enable access to or interaction with the system by one or more users.

DETAILED DESCRIPTION

Figure 1:
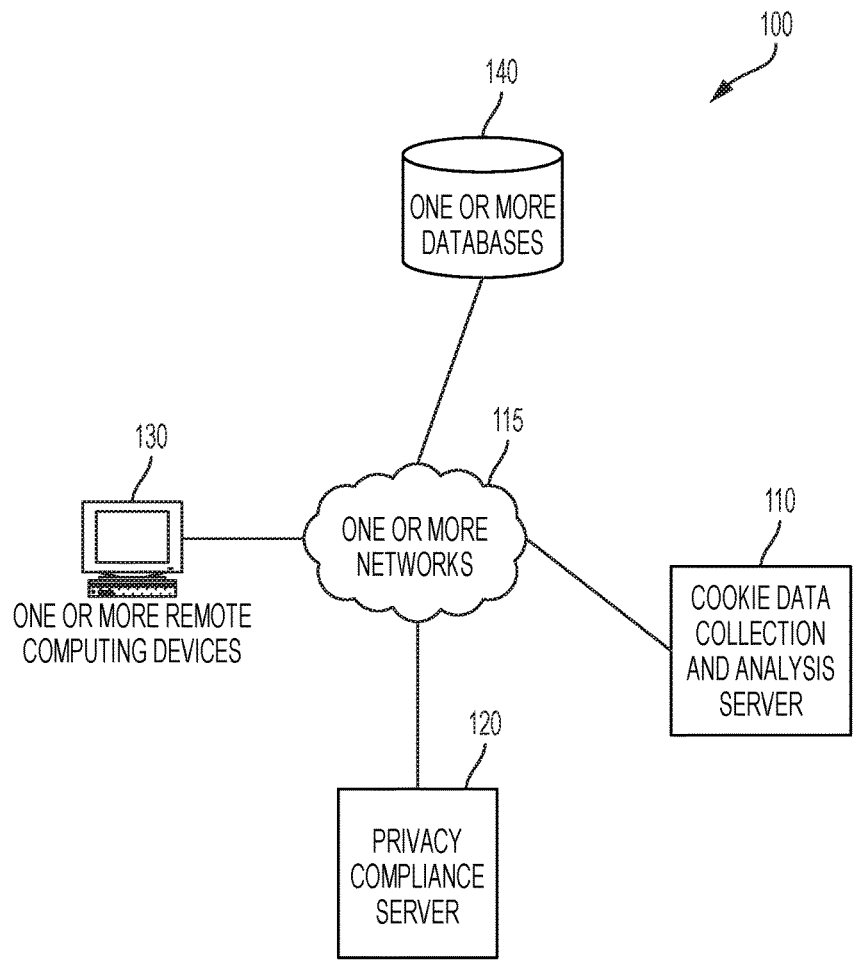
FIG. 1 depicts a cookie data collection and analysis system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, a personal data identification system is configured to determine whether one or more particular cookies can be uniquely attributable to a particular device, a particular user of the particular device, or a particular individual. In such embodiments, a cookie from which a particular individual may be directly identified or potentially identified may fall under the sort of personal data that a particular organization may be required, under one or more legal or industry requirements, to handle in a particular manner.

In various embodiments, the personal data identification system is configured to determine whether one or more particular cookies may be used to directly identify a particular user or individual based on, for example: (1) a host of the one or more particular cookie; (2) a name of the one or more particular cookies; and/or (3) a value for the one or more particular cookies. In particular embodiments, the system is configured to use the host value to determine whether a particular cookie is a first-party cookie or a third-party cookie. As may be understood by one skilled in the art, a cookie may be more likely to identify a user if, for example: (1) the purpose of the cookie is to single out the individual or create a profile (e.g., in the case of a tracking cookie); (2) the cookie is a third-party cookie, and may involve unknown or unclear data practices; (3) the cookie is associated with a third-party host that has a policy that may allow selling and/or sharing of data; and/or (4) whether the cookie persists for a reasonable period of time, which may, for example, increase an amount of longitudinal data that can be compiled for a user associated with the cookie.

In particular embodiments, the personal data identification system may be implemented in the context of any suitable privacy compliance system that is configured to ensure compliance with one or more legal or industry standards related to the collection and storage of private information. In various embodiments, a particular organization or sub-group may initiate a privacy campaign as part of its business activities. In such embodiments, the privacy campaign may include any undertaking by a particular organization (e.g., such as a project or other activity) that includes the collection, entry, and/or storage (e.g., in memory) of any privacy information or personal data associated with one or more individuals. In other embodiments, a privacy campaign may include any project undertaken by an organization that includes the use of personal data, or to any other activity which could have an impact on the privacy of one or more individuals.

In any embodiment described herein, the personal data may include, for example, for an individual: (1) name; (2) address; (3) telephone number; (4) e-mail address; (5) social security number; (6) information associated with one or more credit accounts (e.g., credit card numbers); (7) banking information; (8) location data; (9) internet search history; (10) account data; and/or (11) any other suitable personal information discussed herein. In particular embodiments, such personal data may include one or more cookies (e.g., where the individual is directly identifiable or may be identifiable based at least in part on information stored as part of the one or more cookies).

In various embodiments, the system may, for example, be configured to: (1) generate one or more virtual profiles; (2) use the one or more virtual profiles to access a plurality of websites; (3) collect cookie data for the plurality of websites for the one or more virtual profiles; and (4) analyze the cookie data to determine whether a particular website of the plurality of websites utilizes one or more cookies that may potentially include personal data. The system may then generate a report of the analysis, and display the report to an administrator or other individual associated with the particular website.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a Cookie Data Collection and Analysis System 100 according to a particular embodiment. In various embodiments, the Cookie Data Collection and Analysis System 100 is part of a Privacy Compliance System, or other system, which may, for example, be associated with a particular organization and be configured to ensure compliance with one or more legal or industry regulations related to the collection and storage of personal data. In some embodiments, the Cookie Data Collection and Analysis System 100 is configured to scan and analyze one or more of the particular organization's websites (e.g., one or more webpages) to identify one or more cookies which may contain personal data or may potentially be used to identify a particular individual or device.

As may be understood from FIG. 1, the Cookie Data Collection and Analysis System 100 includes one or more computer networks 115, a Cookie Data Collection and Analysis Server 110, a Privacy Compliance Server 120, one or more remote computing devices 130 (e.g., a desktop computer, laptop computer, tablet computer, smartphone, etc.), and One or More Databases 140. In particular embodiments, the one or more computer networks 115 facilitate communication between the Cookie Data Collection and Analysis Server 110, Privacy Compliance Server 120, one or more remote computing devices 130 (e.g., a desktop computer, laptop computer, tablet computer, etc.), and one or more databases 140.

The one or more computer networks 115 may include any of a variety of types of wired or wireless computer networks such as the Internet, a private intranet, a public switch telephone network (PSTN), or any other type of network. The communication link between Cookie Data Collection and Analysis Server 110 and Database 140 may be, for example, implemented via a Local Area Network (LAN) or via the Internet. In other embodiments, the Database 140 may be stored on any suitable server described herein.

Figure 2:
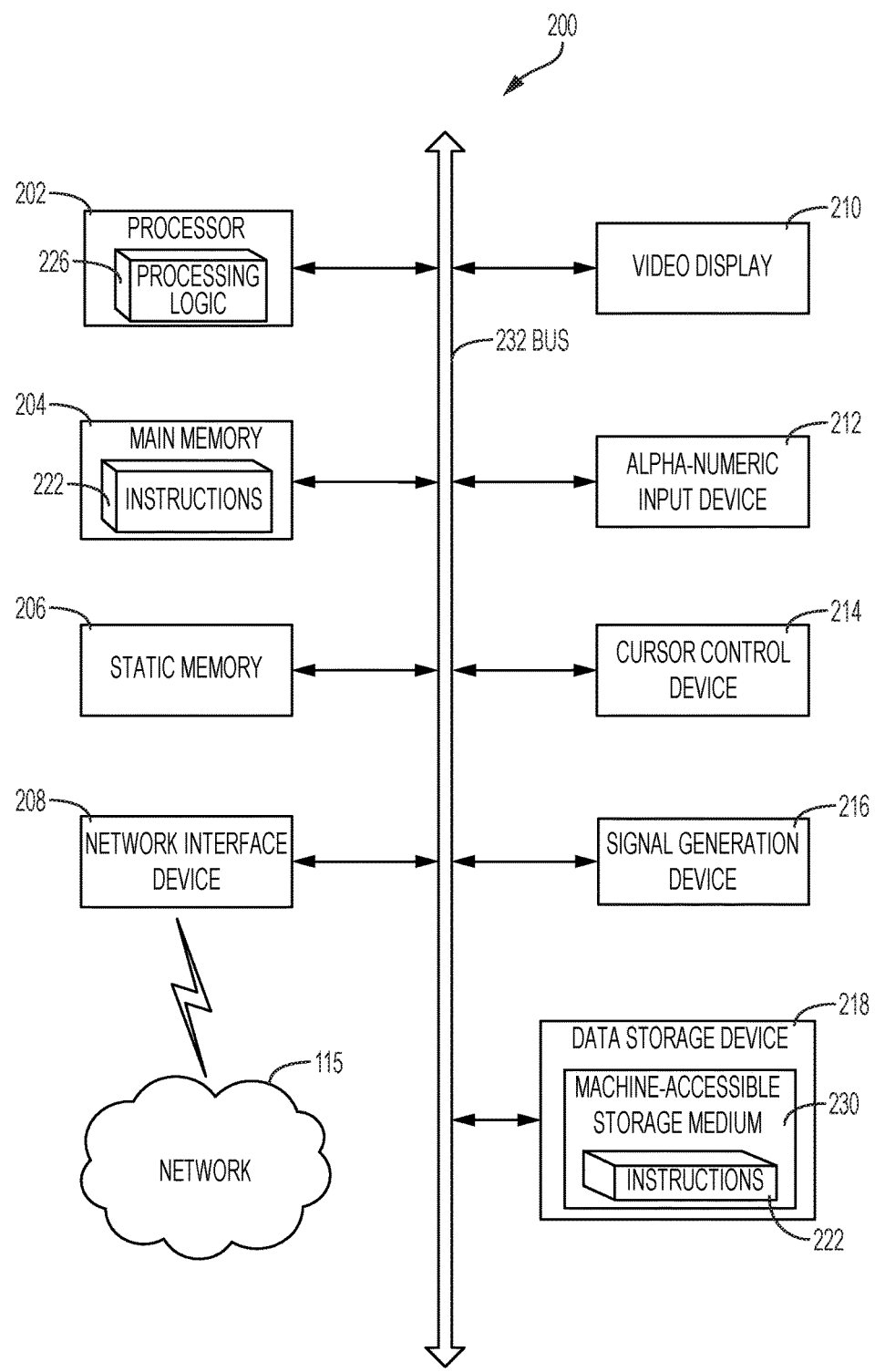
FIG. 2 is a schematic diagram of a computer (such as the cookie data collection and analysis server 110, or one or more remote computing devices 130) that is suitable for use in various embodiments of the cookie data collection and analysis system shown in FIG. 1.

FIG. 2 illustrates a diagrammatic representation of a computer 200 that can be used within the Cookie Data Collection and Analysis System 100, for example, as a client computer (e.g., one or more remote computing devices 130 shown in FIG. 1), or as a server computer (e.g., Cookie Data Collection and Analysis System 110 shown in FIG. 1). In particular embodiments, the computer 200 may be suitable for use as a computer within the context of the Cookie Data Collection and Analysis System 100 that is configured to monitor a user's system inputs to ascertain whether any of those inputs are abnormal.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a cookie data collection and analysis system 100 may be implemented in the context of any suitable system (e.g., a privacy compliance system). For example, the cookie data collection and analysis system may be implemented to analyze a particular company or other organization's website (e.g., or websites) to determine whether the website (e.g., or websites) utilize(s) one or more cookies which may include personal data or may potentially be used to identify a particular individual. In particular embodiments, the system may implement the module in order to at least partially ensure compliance with one or more regulations (e.g., legal requirements) related to the collection and/or storage of personal data. Various aspects of the system's functionality may be executed by certain system modules, including a Cookie Data Collection and Analysis Module 300. This module is discussed in greater detail below. Although this module is presented as a series of steps, it should be understood in light of this disclosure that various embodiments of the Cookie Data Collection and Analysis Module 300 described herein may perform the steps described below in an order other than in which they are presented. In still other embodiments, the Cookie Data Collection and Analysis Module 300 may omit certain steps described below. In various other embodiments, the Cookie Data Collection and Analysis Module 300 may perform steps in addition to those described.

Cookie Data Collection and Analysis Module

In particular embodiments, a Cookie Data Collection and Analysis Module 300 is configured to: (1) collect cookie data for one or more websites; and (2) determine, based at least in part on the cookie data, whether one or more cookies utilized by a particular one of the one or more websites include personal data and/or may potentially be used to identify a particular individual.

Figure 3:
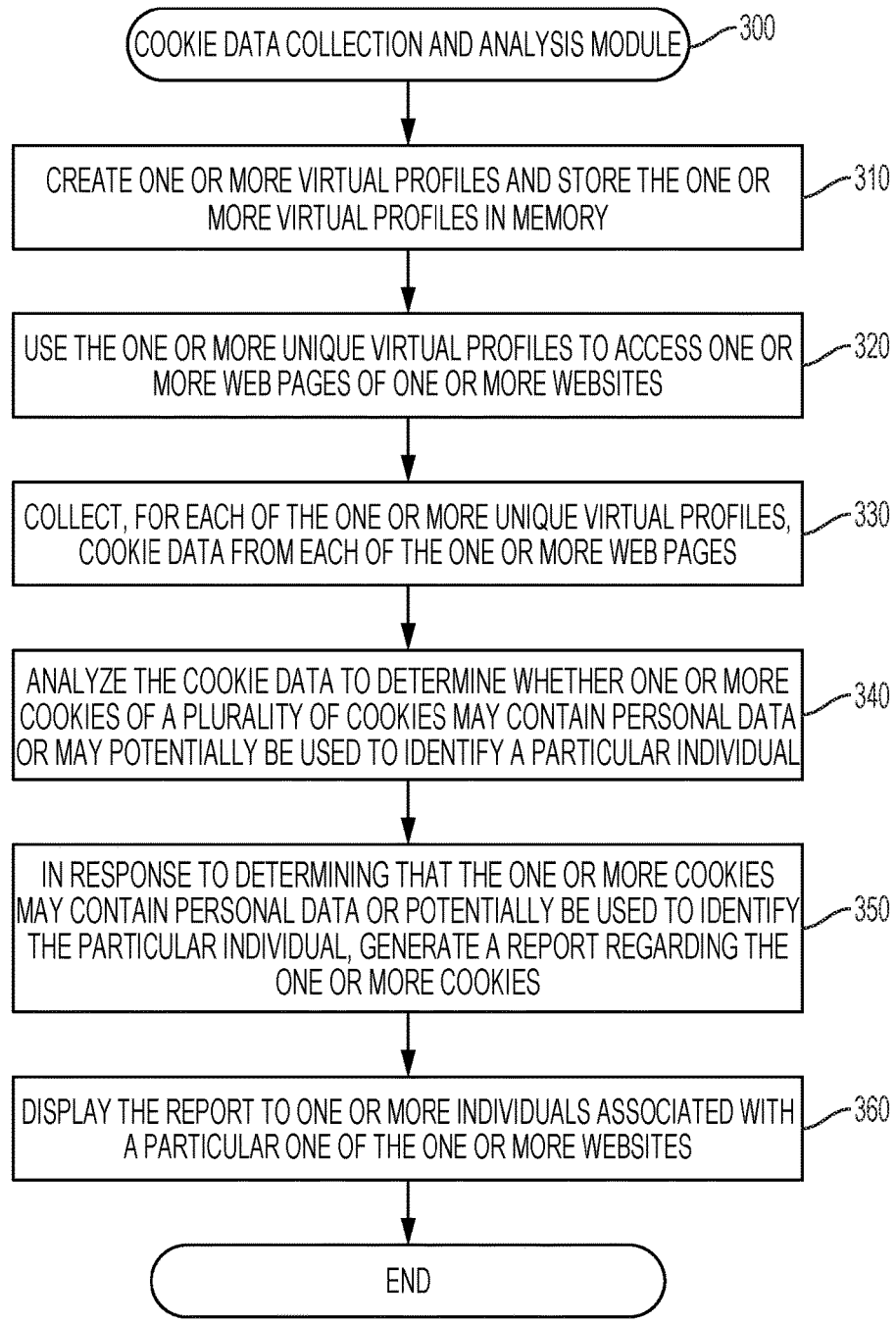
FIG. 3 is a flowchart showing an example of a processes performed by the Cookie Data Collection and Analysis Module according to particular embodiments.

Turning to FIG. 3, in particular embodiments, when executing the Cookie Data Collection and Analysis Module 300, the system begins, at Step 310, by creating one or more virtual profiles and storing the one or more virtual profiles in memory. In particular embodiments, the system is configured to generate a plurality of unique virtual profiles such that one or more websites may recognize each of the unique virtual profiles is the same individual over time. In particular embodiments, the system is configured to generate the unique virtual profiles such that one or more websites may recognize each unique virtual profile both within a particular website and across different websites.

In particular embodiments, the system is configured to create the one or more virtual profiles by assigning one or more attributes (e.g., unique attributes) to each of the one or more unique virtual profiles. In particular embodiments, the one or more attributes may include, for example: (1) one or more browser settings (e.g., browser type, one or more security settings, etc.); (2) one or more connection settings (e.g., connection type, connection speed, IP address, etc.); (3) one or more operating system settings (e.g., Windows, Linux, etc.); (4) one or more device settings (e.g., mobile, desktop, specific type, etc.); (5) name; (6) username; (7) gender; (8) age (e.g., age range); and/or (9) any other suitable attribute that may at least partially define a user profile. In various embodiments, two or more of the unique virtual profiles may share one or more attributes. As a particular example, a first unique virtual profile may comprise the following attributes: (1) browser: Google Chrome; (2) operating system: iOS version 10.1; (3) device: iPhone 6s; (4) username: sample1; etc.

In various embodiments, the system is configured to store the one or more unique virtual profiles in memory. The system may, for example, store the one or more unique virtual profiles in the One or More Databases 140 described above. In particular embodiments, the system is configured to store the one or more unique virtual profiles in memory for later retrieval by the system. In various embodiments, the system is configured to utilize the one or more unique virtual profiles over time to access one or more websites. The system may, for example, utilize a virtual machine to emulate each of the one or more unique virtual profiles and systematically access the one or more websites using each of the one or more unique virtual profiles using the virtual machine. As may be understood in light of this disclosure, this may, for example, enable the system to determine whether particular persistent cookies utilized by particular websites may be used to identify a particular individual. The re-utilization of the one or more unique virtual profiles at various points in time is described more fully below.

Continuing to Step 320, the system, in various embodiments, is configured to use the one or more unique virtual profiles (e.g., each of the one or more unique virtual profiles) to access one or more web pages of one or more websites). In particular embodiments, the system is configured to simulate access by a plurality of unique users to each of the one or more web pages in order to collect cookie data for each of the one or more web pages. In particular embodiments, the system is configured to do this by using the one or more unique virtual profiles to access each webpage of a particular website. In other embodiments, the system is configured to do this by using the one or more unique virtual profiles to access a subset of the webpages that make up a particular website.

In any embodiment described herein, the one or more webpages may include, for example: (1) one or more webpages from one or more related websites (e.g., one or more websites owned or operated by a particular organization, company, or individual); (2) one or more webpages from one or more unrelated websites; (3) one or more webpages that make up a portion of webpages of a particular website; (4) one or more webpages that make up every webpage of a particular website; (5) one or more webpages from a plurality of websites; and/or (6) any other suitable combination of webpages and/or websites.

Returning to Step 330, the system collects, for each of the one or more unique virtual profiles, cookie data from each of the one or more webpages. In particular embodiments, the system is configured to collect the cookie data for each unique virtual profile while the system is using the respective unique virtual profile to access the one or more webpages. The system may, for example: (1) access a first webpage of the one or more webpages using a first unique virtual profile; (2) collect cookie data from the first webpage for the first unique virtual profile; and (3) repeat steps 1 and 2 for each of the one or more webpages using each of the one or more unique virtual profiles. In particular embodiments, the system is configured to substantially simultaneously collect the cookie data for each of the one or more unique virtual profiles. In still other embodiments, the system is configured to collect the cookie data in any suitable order or timeframe.

In particular embodiments, the cookie data may include, for example, data for one or more cookies. In any embodiment described herein, the cookie data may include, for example: (1) a type of each of the one or more cookies; (2) a purpose of each of the one or more cookies; (3) a host of each of the one or more cookies; (4) a name of each of the one or more cookies; (5) a value of each of the one or more cookies; and/or (6) any other suitable data related to each of the one or more cookies.

Continuing to Step 340, the system is configured to analyze the cookie data to determine whether one or more cookies of a plurality of cookies may contain personal data or may potentially be used to identify a particular individual.

In various embodiments, the system may analyze the cookie data to determine a persistence of a particular cookie. In various embodiments, the system may determine an expiration time of a particular cookie. In particular embodiments, the system may be configured to determine that one or more cookies may contain personal data in response to determining that an amount of time prior to the expiration time is above a particular threshold amount of time (e.g., thirty seconds, one minute, one hour, one day, two days, one week, two weeks, one month, or any other suitable amount of time). In various embodiments, the threshold amount of time may vary based at least in part on whether the cookie is a first-party or a third-party cookie.

In particular embodiments, the system is configured to determine whether the one or more cookies are unique to a particular virtual profile. In response to determining that the one or more cookies are unique, the system may determine that the one or more cookies may potentially be used to identify a particular individual.

In various embodiments, the system is configured to analyze the one or more cookies to determine whether the one or more cookies are first-party cookies or third-party cookies. In particular embodiments, the system is configured to determine that a third-party cookie may potentially be used to identify a particular individual. In such embodiments, a third-party cookie may include a cookie generated by a third-party, which may, for example, engage in unknown and or unclear data practices. For example, computer code associated with the third-party cookie may collect information via the cookie for a particular user that is beyond a scope of data intended to that a particular website intended to collect when the website utilized the third-party cookie.

In various embodiments, analyzing the cookie data may include comparing data associated with a first cookie to data associated with a second cookie. In particular embodiments, the first and second cookie may include a first cookie associated with a first virtual profile and a second cookie associated with a second virtual profile. In various embodiments, the system is configured to determine whether the first or second cookie persists across a plurality of webpages across, for example: (1) a particular website; (2) a particular domain; (3) a plurality of websites; and/or (4) a plurality of domains. In various embodiments, the system may determine that a particular cookie that persists across a plurality of websites or domains may include personally identifiable data.

Returning to Step 350, the system, in response to determining that the one or more cookies may contain personal data or potentially be used to identify the particular individual, generates a report regarding the one or more cookies. In various embodiments, the report may include an identification of the one or more cookies. In other embodiments, the report may flag one or more cookies identified as potentially including personal data. In still other embodiments, the system may be configured to automatically cease collection of data associated with the one or more cookies (e.g., until one or more users review the generated report).

Next, at Step 360, the system displays the report to one or more individuals associated with a particular one of the one or more websites. In various embodiments, the system is configured to display the report on a suitable computer device, such as any of the one or more remote computing devices 130 shown in FIG. 1. In particular embodiments, the one or more individuals may include any suitable individual, such as, for example: (1) a site owner of a particular webpage (e.g., of a particular website) of the one or more webpages; (2) a privacy officer associated with an organization that runs a particular webpage of the one or more webpages; and/or (3) any other suitable individual associated with any of the one or more individuals for which the cookie data analysis described above was performed. In particular embodiments, the report may enable the one or more individuals to make one or more changes to (e.g., modify) one or more cookies from the one or more webpages. The modifications may include, for example, one or more changes to modify data collected and stored along with one or more particular cookies to ensure that such storage does not involve personal data in a way that may conflict with one or more legal or industry requirements.

Exemplary User Experience

Figure 5:
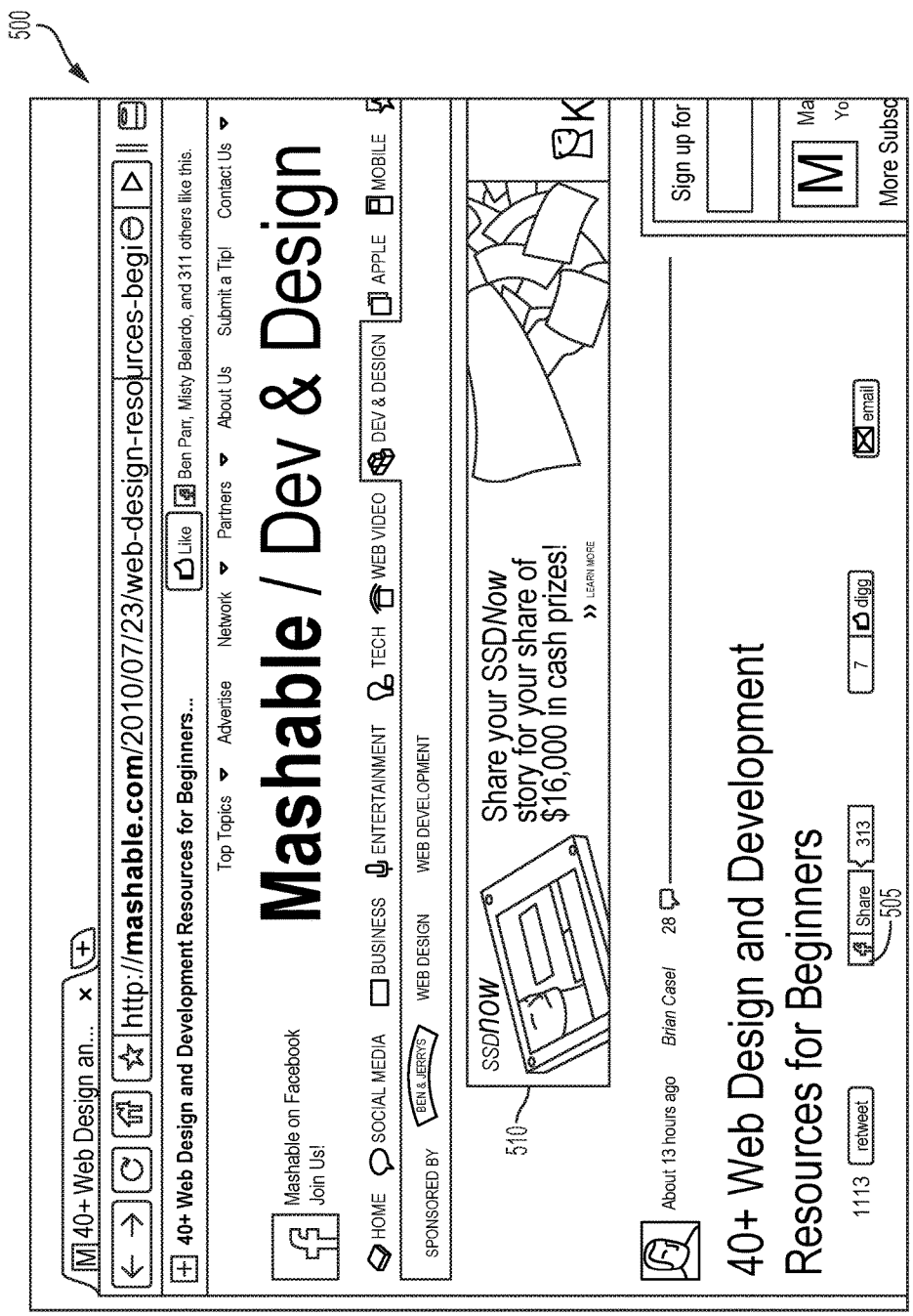

FIGS. 4-5 depict exemplary screen displays that a user may encounter related to the system described herein. FIG. 4 depicts a screen display 400 that a user may experience when accessing a particular website. As may be understood from this figure, a particular website may prompt a user to authorize the collection of data related to their experience on the website using cookies. In various embodiments, the system described herein may determine that cookies collected following authorization from a user are more likely to include personal data and/or may be likely to identify the individual user. In still other embodiments, the system may be configured to not flag such cookies (e.g., in a generated report), as the user has provided explicit authorization to collect such personal data (e.g., via one or more cookies). In still other embodiments, the system may be configured to flag cookies that are prohibited by law.

FIG. 5 depicts an exemplary screen display of a webpage 500 that illustrates exemplary cookies that may persist across a plurality of websites. As shown in this figure, a user has the option to share content from the webpage on Facebook via a Facebook Share button 505. As may be understood from this figure, the webpage is not part of Facebook's domain and is an entirely separate website. In this example, however, because the user is separately logged into Facebook (e.g., on the same web browser), Facebook can track the user at the present webpage using a cookie. The computer code utilized by the present website to enable users to share the website via Facebook would likely be determined by the system to potentially contain personally identifiable information (e.g., through the user's Facebook profile). If, for example, the same user visited a plurality of websites with an embedded Facebook Share Button 505, characteristics for cookies set for the user may become stable for that user. In this example, the likelihood that the user may be identified is relatively high (e.g., because the stability of the profile that may be identified may begin to look like a behavioral profile for that user). The system may, for a different user accessing the websites, create a similarly stable profile for the second user that differs from that of the first user. In this way, cookies that persist across a plurality of websites may be more likely to become uniquely identifiable for particular users. Such cookies may be flagged by the system as potentially problematic for potentially containing personal data or personally identifiable information.

FIG. 5 further includes a third-party advertisement 510, which may, for example, utilize a third-party cookie. As discussed above, third-party cookies may be more likely to include personal data or potentially personally identifiable data. Advertisements such as these may, for example, be encoded by a third-party provider, which may direct advertisements based on information such as a user's browsing history, etc. Accordingly, the system may be configured to determine that a third-party cookie may contain personal information (e.g., and flag it as such in a report for the webpage 500).

Alternative Embodiments

Various embodiments of a system for identifying and determining whether a particular cookie may contain personally identifiable data may include one or more features in addition to those described herein. Various alternative embodiments of such a system are described below.

Real Time Check

In various embodiments, the system is configured to scan a portion of the webpages on a particular website (e.g., rather than the entire website at once). In some embodiments, this may, for example, avoid denial of access by the website (e.g., in response to being identified as an automated access). In such embodiments, the system is configured to scan a first portion of webpages of a particular website (e.g., using one or more virtual profiles) at a first time, and a second portion of webpages at a second time.

Website Scanning in Response to Determination of a Change in Privacy Policy

In particular embodiments, one or more websites may update a privacy policy for the website (e.g., to comply with one or more legal or policy changes). In some embodiments, a change in a privacy policy may modify a relationship between a website and its users. In such embodiments, the system may be configured to: (1) determine that a particular website has changed its privacy policy; and (2) perform a new scan of the website (e.g., using one or more virtual profiles) in response to determining the change. The system may, for example, scan a website's privacy policy at a first time and a second time to determine whether a change has occurred. In some embodiments, the change in policy may modify a manner in which the system analyzes cookie data to determine whether it may include personal data or potentially personally identifiable data.

CONCLUSION

Although embodiments above are described in reference to various privacy compliance monitoring systems, it should be understood that various aspects of the system described above may be applicable to other privacy-related systems, or to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of operationalizing privacy compliance and monitoring user inputs related to privacy campaigns, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for identifying personal data in a particular cookie, the method comprising:

scanning, by one or more processors, using a plurality of unique user profiles, a single website for one or more cookies;

scanning, by one or more processors, a plurality of websites using a first particular one of the plurality of unique user profiles that persists across the plurality of websites for the one or more cookies;

identifying, by one or more processors, the particular cookie from the one or more cookies;

determining, by one or more processors, a host of the particular cookie;

determining, by one or more processors, a purpose of the particular cookie;

determining, by one or more processors, based at least in part on the host of the particular cookie and the purpose of the particular cookie, whether a particular individual is likely to be identified by the particular cookie;

in response to determining that the particular individual is likely to be identified by the particular cookie, generating, by one or more processors, a report regarding a likelihood that the particular individual might be identified by the particular cookie; and displaying, by one or more processors, the report to an individual associated with the single website.

2. The computer-implemented data processing method of claim 1, wherein:

the method further comprises:

generating a plurality of virtual user profiles; and storing the plurality of virtual profiles in memory; and the plurality of unique user profiles comprise the plurality of virtual user profiles.

3. The computer-implemented data processing method of claim 2, wherein:

scanning the plurality of websites using the first particular one of the plurality of unique user profiles comprises scanning the plurality of web sites using the first particular one of the plurality of unique user profiles at a first time;

the method further comprises:

scanning, by one or more processors, the plurality of websites using the first particular one of the plurality of unique user profiles at a second time; and determining, by one or more processors, a persistence of the particular cookie between the first time and the second time; and determining whether a particular individual is likely to be identified by the particular cookie is further based at least in part on the persistence of the particular cookie.

4. The computer-implemented data processing method of claim 1, wherein:

the method further comprises:

determining, by one or more processors, an expiration time of the particular cookie; and determining, by one or more processors, based at least in part on the expiration time, a persistence of the particular cookie; and determining whether a particular individual is likely to be identified by the particular cookie is further based at least in part on the persistence of the particular cookie.

5. The computer-implemented data processing method of claim 1, wherein:

the method further comprises determining, by one or more processors, whether the particular cookie is unique to each of the plurality of unique user profiles; and determining whether a particular individual is likely to be identified by the particular cookie is further based at least in part on whether the particular cookie is unique to each of the plurality of unique user profiles.

6. The computer-implemented data processing method of claim 1, wherein:

the method further comprises:

monitoring, by one or more processors, the single web site for one or more changes;

in response to detecting one or more changes to the single website, scanning, by one or more processors, using the plurality of unique user profiles, the single website for one or more second cookies;

identifying, by one or more processors, a second particular cookie from the one or more second cookies, collecting, by one or more processors, cookie data for the second particular cookie using the plurality of unique user profiles; and determining whether the particular individual is likely to be identified by the second particular cookie based at least in part on the cookie data; and the one or more cookies do not comprise the second particular cookie.

7. The computer-implemented data processing method of claim 1, the method further comprising:

scanning, by one or more processors, the plurality of websites using each of the plurality of unique user profiles, wherein each of the plurality of unique user profiles persists across the plurality of websites for the one or more cookies.

8. The computer-implemented data processing method of claim 1, wherein:

the host is a third-party host; and determining whether the particular individual is likely to be identified by the particular cookie is further based on information associated with the third-party host.

9. A computer-implemented data-processing method of determining whether a particular cookie of one or more cookies may include personally identifiable data, the method comprising:

creating, by one or more processors, a plurality of unique user profiles;

storing, by one or more processors, the plurality of unique user profiles in computer memory;

using, by one or more processors, each of the plurality of unique user profiles to access a plurality of websites over a first period of time;

gathering, by one or more processors, for each of the plurality of websites, cookie data for each of the plurality of unique user profiles, the cookie data comprising the one or more cookies;

determining, by one or more processors, for each of the one or more cookies, a respective cookie host;

determining, by one or more processors, for each of the one or more cookies, a respective cookie purpose;

determining, by one or more processors, based on the respective cookie purpose and the respective cookie host, whether a particular cookie of the one or more cookies may include personally identifiable data; and in response to determining that the particular cookie of the one or more cookies may include the personally identifiable data, transmitting a notification to an individual associated with at least one of the plurality of websites comprising the cookie data associated with the particular cookie.

10. The computer-implemented data-processing method of claim 9, further comprising:

retrieving, by one or more processors, the plurality of unique user profiles from the computer memory;

using, by one or more processors, each of the plurality of unique user profiles to access the plurality of websites over a second period of time;

determining, by one or more processors, a respective persistence of each of the one or more cookies between the first period of time and the second period of time; and determining, by one or more processors, based on the respective persistence, the respective cookie purpose, and the respective cookie host, whether the particular cookie of the one or more cookies may include the personally identifiable data.

11. The computer-implemented data-processing method of claim 9, wherein:

using each of the plurality of unique user profiles to access the plurality of websites over the first period of time comprises using each of the plurality of unique user profiles to access a first portion of webpages that make up the plurality of websites; and the method further comprises using each of the plurality of unique user profiles to access a second portion of webpages that make up the plurality of websites over a second period of time.

12. The computer-implemented data-processing method of claim 9, wherein determining whether the particular cookie of the one or more cookies may include personally identifiable data comprises determining whether the particular cookie is unique for each of the plurality of unique user profiles.

13. The computer-implemented data-processing method of claim 9, wherein determining whether the particular cookie of the one or more cookies may include personally identifiable data comprises determining whether the respective cookie host is a first-party host or a third-party host.

14. The computer-implemented data-processing method of claim 9, wherein determining whether the particular cookie of the one or more cookies may include personally identifiable data comprises determining an expiration time of the particular cookie.

15. The computer-implemented data-processing method of claim 14, wherein the plurality of websites are a plurality of websites associated with a particular organization.

16. The computer-implemented data-processing method of claim 15, wherein:
the method further comprises:
using, by one or more processors, each of the plurality of unique user profiles to access a second plurality of websites over the first period of time;
gathering, by one or more processors, for each of the second plurality of websites, second cookie data for each of the plurality of unique user profiles, the second cookie data comprising one or more second cookies; and
determining, by one or more processors, based on the cookie data and the second cookie data, whether the particular cookie of the one or more cookies may include personally identifiable data; and
the one or more second cookies comprise the particular cookie.

17. A computer-implemented data-processing method of identifying one or more cookies of a plurality of cookies that may contain personal data, the method comprising:
creating, by one or more processors, a first unique user profile;
storing, by one or more processors, the first unique user profile in memory;
using, by one or more processors, the first unique user profile to access one or more first webpages of a first web site;
collecting, by one or more processors, for each of the one or more first webpages, first cookie data for the first unique user profile, the first cookie data being associated with a first plurality of cookies;
using, by one or more processors, the first unique user profile to access one or more second webpages of a second web site;
collecting, by one or more processors, for each of the one or more second webpages, second cookie data for the first unique user profile, the second cookie data being associated with a second plurality of cookies;
determining, by one or more processors, based on the first cookie data and the second cookie data, whether the first plurality of cookies contain one or more cookies that may contain personal data;
in response to determining that the first plurality of cookies contain one or more cookies that may contain personal data, generating, by one or more processors, a report identifying the first plurality of cookies; and
displaying, by one or more processors, the report to a site owner of the first website.

18. The computer-implemented data-processing method of claim 17, wherein determining whether the first plurality of cookies contain one or more cookies that may contain personal data comprises comparing the first cookie data to the second cookie data.

19. The computer-implemented data-processing method of claim 18, wherein:
the method further comprises:
creating, by one or more processors, a second unique user profile;
storing, by one or more processors, the second unique user profile in memory;
using, by one or more processors, the second unique user profile to access the one or more first webpages of the first website;
collecting, by one or more processors, for each of the one or more first webpages, third cookie data for the second unique user profile, the third cookie data being associated with a third plurality of cookies;
using, by one or more processors, the second unique user profile to access the one or more second webpages of the second website;
collecting, by one or more processors, for each of the one or more second webpages, fourth cookie data for the second unique user profile, the fourth cookie data being associated with a fourth plurality of cookies; and
determining, by one or more processors, based on the first cookie data, the second cookie data, the third cookie data, and the fourth cookie data, whether the first plurality of cookies contain one or more cookies that may contain personal data; and
determining whether the first plurality of cookies contain one or more cookies that may contain personal data comprises comparing the first cookie data, the second cookie data, the third cookie data, and the fourth cookie data with one another.

20. The computer-implemented data-processing method of claim 19, wherein determining whether the first plurality of cookies contain one or more cookies that may contain personal data comprises:
identifying a first cookie of the first plurality of cookies;
identifying a second cookie of the third plurality of cookies that corresponds to the first cookie;
determining whether the first cookie is unique to the first unique user profile; and
determining whether the second cookie is unique to the second unique user profile.

\* \* \* \* \*